(12) United States Patent
Kobayashi et al.

(10) Patent No.: US 10,662,316 B2
(45) Date of Patent: May 26, 2020

(54) MAGNETO-RHEOLOGICAL ELASTOMER COMPOSITION, METHOD FOR PRODUCING SAME, AND VIBRATION ABSORBING DEVICE INCLUDING SAME

(71) Applicant: Fuji Polymer Industries Co., Ltd., Nagoya-shi, Aichi (JP)

(72) Inventors: Shingo Kobayashi, Aichi (JP); Mai Sugie, Aichi (JP); Masakazu Hattori, Aichi (JP); Toshihiko Komatsuzaki, Ishikawa (JP)

(73) Assignee: Fuji Polymer Industries Co., Ltd., Aichi (JP)

(*) Notice: Subject to any disclaimer, the term of this patent is extended or adjusted under 35 U.S.C. 154(b) by 402 days.

(21) Appl. No.: 15/380,568

(22) Filed: Dec. 15, 2016

(65) Prior Publication Data

US 2017/0275438 A1 Sep. 28, 2017

(30) Foreign Application Priority Data

Mar. 25, 2016 (JP) ................................. 2016-061500

(51) Int. Cl.
| | | |
|---|---|---|
| *C08K 9/06* | (2006.01) | |
| *C08L 101/00* | (2006.01) | |
| *H01F 1/44* | (2006.01) | |
| *H01F 1/147* | (2006.01) | |
| *C08L 83/04* | (2006.01) | |
| *C08G 77/20* | (2006.01) | |
| *C08G 77/12* | (2006.01) | |

(52) U.S. Cl.
CPC .............. *C08K 9/06* (2013.01); *C08L 101/00* (2013.01); *H01F 1/14708* (2013.01); *H01F 1/14791* (2013.01); *H01F 1/442* (2013.01); *C08G 77/12* (2013.01); *C08G 77/20* (2013.01); *C08K 2201/01* (2013.01); *C08L 83/04* (2013.01)

(58) Field of Classification Search
CPC ...... H01F 1/447; H01F 1/442; H01F 1/14708; H01F 1/14791; H01F 1/14766; H01F 1/14758; C09K 9/006; C09K 9/04
See application file for complete search history.

(56) References Cited

U.S. PATENT DOCUMENTS

| | | | | |
|---|---|---|---|---|
| 3,615,910 A | * | 10/1971 | Tomita | ................... C22C 19/00 148/312 |
| 3,708,324 A | * | 1/1973 | Stebleton | ................... C08J 3/24 427/342 |
| 4,497,722 A | | 2/1985 | Tsuchida et al. | |
| 5,578,238 A | | 11/1996 | Weiss et al. | |
| 7,261,834 B2 | * | 8/2007 | Fuchs | ................... F16F 1/3605 252/62.53 |
| 7,608,197 B2 | * | 10/2009 | Bose | ................... F16F 1/361 252/62.52 |
| 2004/0236054 A1 | * | 11/2004 | George | ................... C07F 15/0086 528/15 |
| 2005/0006826 A1 | | 1/2005 | Kato | |
| 2005/0116194 A1 | | 6/2005 | Fuchs et al. | |
| 2005/0170085 A1 | | 8/2005 | Mori et al. | |
| 2010/0314572 A1 | | 12/2010 | Bose et al. | |
| 2011/0121223 A1 | | 5/2011 | Ulicny et al. | |

FOREIGN PATENT DOCUMENTS

| | | |
|---|---|---|
| CN | 103467997 | 12/2013 |
| EP | 1 496 015 | 1/2005 |
| JP | 2001-067942 | 3/2001 |
| JP | 2003-026924 | 1/2003 |
| JP | 3838749 B | 10/2006 |
| JP | 2006-307209 | 11/2006 |
| JP | 2008-013631 | 1/2008 |
| JP | 2008-021990 | 1/2008 |
| JP | 2008-106301 | 5/2008 |
| JP | 2008-195826 | 8/2008 |
| JP | 4198013 B | 12/2008 |
| JP | 4257645 | 2/2009 |
| JP | 4764220 B | 8/2011 |
| JP | 2012-044084 | 3/2012 |
| JP | 2013-064441 | 4/2013 |
| JP | 2013-64441 | * 4/2013 |
| JP | 2013-181090 | 9/2013 |
| JP | 2014-065893 | 4/2014 |

OTHER PUBLICATIONS

Transition for JP 2013-64441, Apr. 11, 2013.*
Search Report issued for corresponding United Kingdom patent application No. 1700255.1, dated Jun. 21, 2017, 4 pages.
Office Action issued in corresponding Chinese Patent Application No. 201710065845.2, dated Nov. 1, 2019, 7 pages.

* cited by examiner

*Primary Examiner* — C Melissa Koslow
(74) *Attorney, Agent, or Firm* — Hamre, Schumann, Mueller & Larson, P.C.

(57) ABSTRACT

A magneto-rheological elastomer composition (10) includes a matrix resin (12) and a magnetic powder (11). The magnetic powder (11) is contained in an amount of 30 to 70% by volume based on 100% by volume of the composition. The magneto-rheological elastomer composition (10) has an Asker C hardness of 5 to 60 as determined by the Standard SRIS0101 of the Society of Rubber Science and Technology, Japan. The average particle size of the magnetic powder is preferably 2 to 500 μm, and the matrix resin is preferably an organopolysiloxane. The storage modulus of the magneto-rheological elastomer composition preferably changes by five times or more upon application of a magnetic force with a magnetic flux density of 200 mT. Thus, the present invention provides a magneto-rheological elastomer composition that greatly changes its storage modulus upon application of magnetism, a method for producing the same, and a vibration absorbing device including the same.

8 Claims, 2 Drawing Sheets

MAGNETO-RHEOLOGICAL ELASTOMER COMPOSITION, METHOD FOR PRODUCING SAME, AND VIBRATION ABSORBING DEVICE INCLUDING SAME

BACKGROUND OF THE INVENTION

1. Field of the Invention

The present invention relates to a magneto-rheological elastomer composition, more specifically, a magneto-rheological elastomer composition that greatly changes its storage modulus upon application of magnetism, a method for producing the same, and a vibration absorbing device including the same.

2. Description of Related Art

A fluid that changes its rheological property upon application of a magnetic field is called a magneto-rheological fluid (MR fluid), and known as a non-colloidal suspension in which magnetically active particles such as fine magnetic powder are dispersed uniformly in a liquid. The MR fluid can be used not only for impact absorption, power transmission and attitude control, but also for clutches, dampers and shock absorbers of vehicles, damping support devices for various structures, muscle parts of assembly robots, liquid flow rate control valves, various acoustic systems, and medical and welfare robotic hands and care hands. However, since the MR fluid has poor handleability, MR elastomers with high handleability have been proposed recently.

Patent Document 1 proposes dispersing a magnetic filler such as permalloy (Fe—Ni alloy) in a viscoelastic resin material and rotationally molding it to obtain a magnetic field responsive composition. Patent Document 2 proposes dispersing a magnetic filler in a viscoelastic resin material and curing it during application of a magnetic field. Patent Document 3 proposes orienting magnetic particles in a resin material, and Patent Document 4 proposes not orienting magnetic particles in a resin material.

PRIOR ART DOCUMENTS

Patent Documents

[Patent Document 1] JP 2013-064441 A
[Patent Document 2] JP 2013-181090A
[Patent Document 3] JP 2008-195826 A
[Patent Document 4] JP 2008-013631A However, such conventional magneto-rheological compositions do not sufficiently change their storage moduli upon application of magnetism.

SUMMARY OF THE INVENTION

Therefore, with the foregoing in mind, it is an object of the present invention to provide a magneto-rheological elastomer composition that greatly changes its storage modulus upon application of magnetism, a method for producing the same, and a vibration absorbing device including the same.

A magneto-rheological elastomer composition of the present invention includes a matrix resin and a magnetic powder. The magnetic powder is contained in an amount of 30 to 70% by volume based on 100% by volume of the composition. The magneto-rheological elastomer composition has an Asker C hardness of 5 to 60 as determined by the Standard SRIS0101 of the Society of Rubber Science and Technology, Japan.

A method for producing the magneto-rheological elastomer composition of the present invention is characterized in that the magneto-rheological elastomer composition is obtained by curing a mixture with the following constitution:

(A) a base polymer component: a linear organopolysiloxane having an average of two or more alkenyl groups per molecule, in which the alkenyl groups are bonded to silicon atoms at both ends of the molecular chain;

(B) a crosslinking component: an organohydrogenpolysiloxane having an average of two or more hydrogen atoms bonded to silicon atoms per molecule, in which an amount of the organohydrogenpolysiloxane is less than 1 mol with respect to 1 mol of the alkenyl groups bonded to the silicon atoms in the component (A);

(C) a platinum-based metal catalyst: an amount of the catalyst is 0.01 to 1000 ppm in weight with respect to the component (A);

(D) a magnetic powder: an amount of the magnetic powder is 30 to 70% by volume with respect to 100% by volume of the organopolysiloxane; and (E) an inorganic pigment. The inorganic pigment (E) is optional.

A vibration absorbing device of the present invention includes the above magneto-rheological elastomer composition, wherein the magneto-rheological elastomer composition is arranged in a vibration portion, and the vibration absorbing device absorbs vibration of the vibration portion using a change in a storage modulus of the magneto-rheological elastomer composition upon application of a magnetic force.

The present invention provides a magneto-rheological elastomer composition that greatly changes its storage modulus upon application of magnetism. High storage modulus change means a high vibration absorbing property and a high damping effect.

DETAILED DESCRIPTION OF THE INVENTION

Hereinafter, the present invention will be described by way of illustrative embodiments with reference to the drawings.

The present invention relates to a magneto-rheological elastomer composition that contains a matrix resin and a magnetic powder. The magnetic powder is a soft magnetic metal powder or an oxide magnetic powder (ferrite powder). Examples of the soft magnetic metal powder include powders of iron-based alloys including an Fe—Si alloy, an Fe—Al alloy, an Fe—Si—Al alloy, an Fe—Si—Cr alloy, an Fe—Ni alloy, an Fe—Ni—Co alloy, an Fe—Ni—Mo alloy, an Fe—Co alloy, an Fe—Si—Al—Cr alloy, an Fe—Si—B alloy and an Fe—Si—Co—B alloy, and a carbonyl iron powder. Examples of the ferrite powder include powders of spinel-based ferrites including Mn—Zn, Mn—Mg—Zn, Mg—Cu—Zn, Ni—Zn, Ni—Cu—Zn and Cu—Zn ferrites, and powders of hexagonal ferrites such as W, Y, Z and M types. In the present invention, a carbonyl iron powder or permalloy 50Fe-50Ni is preferred.

The carbonyl iron powder is well-known as one of the soft magnetic iron powders and as a powder product. The carbonyl iron powder is obtained by vaporizing and decomposing carbonyl iron ($Fe(CO)_5$) to remove CO. The average particle size of the carbonyl iron powder is preferably 2 to 10 μm, more preferably 2 to 8 μm. The particle size is measured with a laser diffraction scattering method to determine a particle size at 50% (by mass). The method may use a laser diffraction particle size analyzer LA-950S2 manufactured by Horiba, Ltd.

The magneto-rheological elastomer composition contains 30 to 70 vol %, more preferably 35 to 70 vol % of the magnetic powder based on 100 vol % of the composition. Within this range, the storage modulus changes sufficiently upon application of a magnetic force.

The matrix resin may be either a thermosetting resin or a thermoplastic resin. Rubber and elastomer are included as the matrix resin. Examples of the rubber include (but are not limited to) the following: natural rubber (NR: ASTM abbreviation); isoprene rubber (IR); butadiene rubber (BR); 1,2-polybutadiene rubber (1,2-BR); styrene-butadiene rubber (SBR); chloroprene rubber (CR); nitrile rubber (NBR); butyl rubber (IIR); ethylene-propylene rubber (EPM, EPDM); chlorosulfonated polyethylene (CSM); acrylic rubber (ACM, ANM); epichlorohydrin rubber (CO, ECO); polysulfide rubber (T); silicone rubber; fluorocarbon rubber (FKM); and urethane rubber (U). These materials can also be applied to the thermoplastic elastomer (TPE). Examples of the thermoplastic elastomer (TPE) include (but are not limited to the following: styrene based TPE; olefin based TPE; vinyl chloride based TPE; urethane based TPE; ester based TPE; amide based TPE; chlorinated polyethylene based TPE; syn-1,2-polybutadiene based TPE; trans-1,4-polyisoprene based TPE; and fluorine based TPE. The term "based" as used herein refers to, e.g., a homopolymer or copolymer thereof. Crosslinking of the silicone rubber may be either an addition reaction or a peroxide reaction. In the following, crosslinking by addition reaction will be described.

The matrix resin is preferably an organopolysiloxane. This is because the organopolysiloxane has high heat resistance and good processability. The composition including the organopolysiloxane as a matrix may be in any form of rubber, rubber sheet, putty, or grease.

The magneto-rheological elastomer composition has an Asker C hardness of 5 to 60, more preferably 20 to 50 as determined by the Standard SRIS0101 of the Society of Rubber Science and Technology, Japan. Within this range, it is possible to obtain a magneto-rheological elastomer composition that greatly changes its storage modulus upon application of a magnetic force. The storage modulus of the magneto-rheological elastomer composition of the present invention changes preferably by five times or more, more preferably nine times or more upon application of a magnetic force with a magnetic flux density of 0.2 T. The change in the storage modulus within the above range is practical.

When the organopolysiloxane is used as a matrix resin, it is preferable to obtain the magneto-rheological elastomer composition by curing a mixture with the following constitution:

(A) a base polymer component: a linear organopolysiloxane having an average of two or more alkenyl groups per molecule, in which the alkenyl groups are bonded to silicon atoms at both ends of the molecular chain;

(B) a crosslinking component: an organohydrogenpolysiloxane having an average of two or more hydrogen atoms bonded to silicon atoms per molecule, in which the amount of the organohydrogenpolysiloxane is less than 1 mol with respect to 1 mol of the alkenyl groups bonded to the silicon atoms in the component (A);

(C) a platinum-based metal catalyst: the amount of the catalyst is 0.01 to 1000 ppm in weight with respect to the component (A);

(D) a magnetic powder: the amount of the magnetic powder is 30 to 70 vol % with respect to 100 vol % of the organopolysiloxane; and

(E) an inorganic pigment: the amount of the inorganic pigment is 0.1 to 10 parts by weight with respect to 100 parts by weight of the matrix resin. The component (E) is an optional component.

(1) Base Polymer Component (Component (A))

The base polymer component (component (A)) is an organopolysiloxane having two or more alkenyl groups bonded to silicon atoms per molecule. The organopolysiloxane containing two alkenyl groups is the base resin (base polymer component) of the silicone rubber composition of the present invention. In the organopolysiloxane, two alkenyl groups having 2 to 8 carbon atoms, and preferably 2 to 6 carbon atoms such as vinyl groups or allyl groups are bonded to the silicon atoms per molecule. The viscosity of the organopolysiloxane is preferably 10 to 1000000 mPa·s, and more preferably 100 to 100000 mPa·s at 25° C. in terms of workability and curability.

Specifically, an organopolysiloxane expressed by the following general formula (chemical formula 1) is used. The organopolysiloxane has an average of two or more alkenyl groups per molecule, in which the alkenyl groups are bonded to silicon atoms at both ends of the molecular chain. The organopolysiloxane is a linear organopolysiloxane whose side chains are blocked with triorganosiloxy groups. The viscosity of the linear organopolysiloxane is preferably 10 to 1000000 mPa·s at 25° C. in terms of workability and curability. Moreover, the linear organopolysiloxane may include a small amount of branched structure (trifunctional siloxane units) in the molecular chain.

[Chemical Formula 1]

In this formula, $R^1$ represents substituted or unsubstituted monovalent hydrocarbon groups that are the same as or different from each other and have no aliphatic unsaturated bond, $R^2$ represents alkenyl groups, and k represents 0 or a positive integer. The monovalent hydrocarbon groups represented by $R^1$ preferably have 1 to 10 carbon atoms, and more preferably 1 to 6 carbon atoms. Specific examples of the monovalent hydrocarbon groups include the following: alkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups; aralkyl groups such as benzyl, phenylethyl, and phenylpropyl groups; and substituted forms of these groups in which some or all hydrogen atoms are substituted by halogen atoms (fluorine, bromine, chlorine, etc.) or cyano groups, including halogen-substituted alkyl groups such as chloromethyl, chloropropyl, bromoethyl, and trifluoropropyl groups and cyanoethyl groups. The alkenyl groups represented by $R^2$ preferably have 2 to 6 carbon atoms, and more preferably 2 to 3 carbon atoms. Specific examples of the alkenyl groups include vinyl, allyl, propenyl, isopropenyl, butenyl, isobutenyl, hexenyl, and cyclohexenyl groups. In particular, the vinyl group is preferred. In the general formula (1), k is typically 0 or a positive integer satisfying $0 \leq k \leq 10000$, preferably $5 \leq k \leq 2000$, and more preferably $10 \leq k \leq 1200$.

The component (A) may also include an organopolysiloxane having three or more, typically 3 to 30, and preferably about 3 to 20, alkenyl groups bonded to silicon atoms per molecule. The alkenyl groups have 2 to 8 carbon atoms, and preferably 2 to 6 carbon atoms and can be, e.g., vinyl groups or allyl groups. The molecular structure may be a linear, ring, branched, or three-dimensional network structure. The organopolysiloxane is preferably a linear organopolysiloxane in which the main chain is composed of repeating diorganosiloxane units, and both ends of the molecular chain are blocked with triorganosiloxy groups. The viscosity of the linear organopolysiloxane is preferably 10 to 1000000 mPa·s, and more preferably 100 to 100000 mPa·s at 25° C.

Each of the alkenyl groups may be bonded to any part of the molecule. For example, the alkenyl group may be bonded to either a silicon atom that is at the end of the molecular chain or a silicon atom that is not at the end (but in the middle) of the molecular chain. In particular, a linear organopolysiloxane expressed by the following general formula (chemical formula 2) is preferred. The linear organopolysiloxane has 1 to 3 alkenyl groups on each of the silicon atoms at both ends of the molecular chain. In this case, however, if the total number of the alkenyl groups bonded to the silicon atoms at both ends of the molecular chain is less than 3, at least one alkenyl group is bonded to the silicon atom that is not at the end of (but in the middle of) the molecular chain (e.g., as a substituent in the diorganosiloxane unit). As described above, the viscosity of the linear organopolysiloxane is preferably 10 to 1000000 mPa·s at 25° C. in terms of workability and curability. Moreover, the linear organopolysiloxane may include a small amount of branched structure (trifunctional siloxane units) in the molecular chain.

[Chemical Formula 2]

In this formula, $R^3$ represents substituted or unsubstituted monovalent hydrocarbon groups that are the same as or different from each other and at least one of them is an alkenyl group, $R^4$ represents substituted or unsubstituted monovalent hydrocarbon groups that are the same as or different from each other and have no aliphatic unsaturated bond, $R^5$ represents alkenyl groups, and l and m represents 0 or a positive integer. The monovalent hydrocarbon groups represented by $R^3$ preferably have 1 to 10 carbon atoms, and more preferably 1 to 6 carbon atoms. Specific examples of the monovalent hydrocarbon groups include the following: alkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups; aralkyl groups such as benzyl, phenylethyl, and phenylpropyl groups; alkenyl groups such as vinyl, ally), propenyl, isopropenyl, butenyl, hexenyl, cyclohexenyl, and octenyl groups; and substituted forms of these groups in which some or all hydrogen atoms are substituted by halogen atoms (fluorine, bromine, chlorine, etc.) or cyano groups, including halogen-substituted alkyl groups such as chloromethyl, chloropropyl, bromoethyl, and trifluoropropyl groups and cyanoethyl groups.

The monovalent hydrocarbon groups represented by $R^4$ also preferably have 1 to 10 carbon atoms, and more preferably 1 to 6 carbon atoms. The monovalent hydrocarbon groups may be the same as the specific examples of $R^1$, but do not include an alkenyl group. The alkenyl groups represented by $R^5$ preferably have 2 to 6 carbon atoms, and more preferably 2 to 3 carbon atoms. Specific examples of the alkenyl groups are the same as those of $R^2$ in the above formula (chemical formula 1), and the vinyl group is preferred.

In the general formula (chemical formula 2), l and m are typically 0 or positive integers satisfying $0 < l+m \leq 10000$, preferably $5 \leq l+m \leq 2000$, and more preferably $10 \leq l+m \leq 1200$. Moreover, l and m are integers satisfying $0 < l/(1+m) \leq 0.2$, and preferably $0.0011 \leq l/(1+m) \leq 0.1$.

(2) Crosslinking Component (Component (B))

The component (B) of the present invention is an organohydrogenpolysiloxane that acts as a crosslinking agent. The addition reaction (hydrosilylation) between SiH groups in the component (B) and alkenyl groups in the component (A) produces a cured product. Any organohydrogenpolysiloxane that has two or more hydrogen atoms (i.e., SiH groups) bonded to silicon atoms per molecule may be used. The molecular structure of the organohydrogenpolysiloxane may be a linear, ring, branched, or three-dimensional network structure. The number of silicon atoms in a molecule (i.e., the degree of polymerization) may be 2 to 1000, and preferably about 2 to 300.

The locations of the silicon atoms to which the hydrogen atoms are bonded are not particularly limited. The silicon atoms may be either at the ends or not at the ends (but in the middle) of the molecular chain. The organic groups bonded to the silicon atoms other than the hydrogen atoms may be, e.g., substituted or unsubstituted monovalent hydrocarbon groups that have no aliphatic unsaturated bond, which are the same as those of $R^1$ in the above general formula (chemical formula 1).

The following structures can be given as examples of the organohydrogenpolysiloxane of the component (B).

[Chemical Formula 3]

-continued

[Chemical Formula 4]

[Chemical Formula 5]

In these formulas, Ph represents organic groups including at least one of phenyl, epoxy, acryloyl, methacryloyl, and alkoxy groups, L is an integer of 0 to 1000, and preferably 0 to 300, and M is an integer of 1 to 200.

(3) Catalyst Component (Component (C))

The component (C) is a catalyst component that accelerates the curing of the composition of the present invention. The component (C) may be a known catalyst used for a hydrosilylation reaction. Examples of the catalyst include platinum group metal catalysts such as platinum-based, palladium-based, and rhodium-based catalysts. The platinum-based catalysts include, e.g., platinum black, platinic chloride, chloroplatinic acid, a reaction product of chloroplatinic acid and monohydric alcohol, a complex of chloroplatinic acid and olefin or vinylsiloxane, and platinum bisacetoacetate. The component (C) may be mixed in an amount that is required for curing, and the amount can be appropriately adjusted in accordance with the desired curing rate or the like. The component (C) is added at 0.01 to 1000 ppm based on the weight of metal atoms to the component (A).

(4) Magnetic Powder (Component (D))

It is preferable that the magnetic powder is surface treated with alkoxysilane or alkyltitanate. This surface treatment prevents a silicone rubber from curing. It is preferable that the alkoxysilane is a silane compound or its partial hydrolysate, and the silane compound is expressed by $R(CH_3)_a Si(OR')_{3-a}$, where R represents an alkyl group having 1 to 20 carbon atoms, R' represents an alkyl group having 1 to 4 carbon atoms, and a is 0 or 1. Examples of an alkaxysilane compound (simply referred to as "silane" in the following) are expressed by $R(CH_3)_a Si(OR')_{3-a}$, where R represents an alkyl group having 1 to 20 carbon atoms, R' represents an alkyl group having 1 to 4 carbon atoms, and a is 0 or 1, include the following: methyltrimethoxysilane; ethyltrimethoxysilane; propyltrimethoxysilane; butyltrimethoxysilane; pentyltrimethoxysilane; hexyltrimethoxysilane; hexyltrimethoxysilane; octyltrimethoxysilane; octyltriethoxysilane; decyltrimethoxysilane; decyltriethoxysilane; dodecyltrimethoxysilane; dodecyltriethoxysilane; hexadodecyltrimethoxysilane; hexadodecyltriethoxysilane; octadecyltrimethoxysilane; and octadecyltriethoxysilane. These silane compounds may be used individually or in combinations of two or more. The alkoxysilane and one-end silanol siloxane may be used together as the surface treatment agent. In this case, the surface treatment may include adsorption in addition to a covalent bond.

(5) Other Components (Component (E))

The composition of the present invention may include components other than the above as needed. For example, the composition may include an inorganic pigment such as colcothar, and alkoxy group-containing silicone such as alkyltrialkoxysilane used, e.g., for the surface treatment of a filler.

A vibration absorbing device of the present invention includes the above magneto-rheological elastomer composition, wherein the magneto-rheological elastomer composition is arranged in a vibration portion, and the vibration absorbing device absorbs vibration of the vibration portion using a change in a storage modulus of the magneto-rheological elastomer composition upon application of a magnetic force. The vibration portion is preferably a vibration portion of at least one selected from an impact absorption part, a power transmission part, an attitude control part, a clutch of a vehicle, a damper of a vehicle, a shock absorber of a vehicle, a damping support device for a structure, a muscle part of an assembly robot, a liquid flow rate control valve, an acoustic system, and medical and welfare robotic and care hands.

Figure 1:
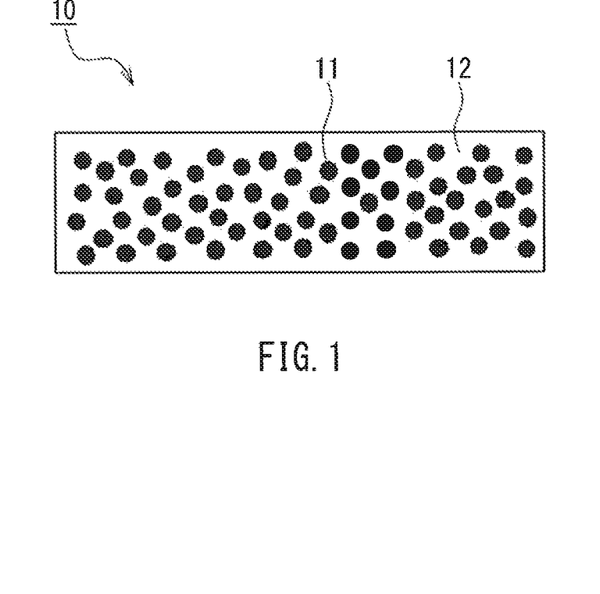
FIG. 1 is a schematic cross-sectional view of a magneto-rheological elastomer composition sheet in an example of the present invention.

Hereinafter, the present invention will be described with reference to drawings. FIG. 1 is a schematic cross-sectional view of a magneto-rheological elastomer composition sheet in an example of the present invention. In a magneto-rheological elastomer composition sheet 10, a magnetic powder 11 is dispersed in a matrix resin 12.

A method for measuring the storage modulus will be described with reference to FIG. 2. A storage modulus measuring device 20 includes a DC stabilizing power supply 21, a magnetic coil 22, and an upper iron core 23. The DC stabilizing power supply 21 generates an electric current to be applied to the coil part 22. The magnetic coil 22 generates a magnetic field to form a closed magnetic circuit within the iron cores 23, 24 and MREs 25a, 25b. The upper iron core 23 serves as a path through which magnetic flux lines, which pass orthogonal to the cross section of the MREs 25a and 25b, travel. The upper iron core 23 also serves as a mass of a single degree-of-freedom vibration system in viscoelasticity evaluation equations. Similarly to the upper iron core 23, the lower iron core 24 is a path through which the magnetic flux lines travel. 25a and 25b are MREs (magneto-rheological elastomers: measurement samples) as viscoelastic elements in the single degree-of-freedom vibration system. The viscoelasticity of the MREs 25a, 25b is evaluated by estimating the deformation of the MREs in the left and right directions (shear direction) of FIG. 2 in accordance with the relative displacement of the upper and lower iron cores 23, 24 in the same direction. An accelerometer 26a measures acceleration in the horizontal direction generated on the upper iron core 23. An accelerometer 26b measures acceleration (vibration input acceleration) in the horizontal direction generated on the lower iron core 24. A horizontal vibrating table 27 is connected to the lower iron core 24, regulates the displacement of the iron core 24 in the vertical direction, and vibrates the iron core 24 in the horizontal direction. An electromagnetic vibrator 28 is connected to the horizontal vibrating table 27, and moves the vibrating table in the horizontal direction. A power amplifier 29 supplies an electric power to the electromagnetic vibrator 28. A signal analyzer 30 performs, in a frequency range, transfer function processing to acceleration signals detected at the accelerometers 26a and 26b. A signal amplifier 31 amplifies voltage signals from the accelerometers 26a and 26b.

Among the coil 22, the upper iron core 23, the lower iron core 24 and the MREs (measurement samples) 25a, 25b that are placed on the horizontal vibrating table 27, the storage modulus measuring device 20 recognizes a combination of the coil 22 and the upper iron core 23 as a mass, and the MREs (measurement samples: elastomer) 25a and 25b as two parallel spring elements. A single degree-of-freedom vibration system constituted by the mass of these and the spring elements undergoes displacement excitation on a base (horizontal vibrating table 27), thereby vibrating in the horizontal direction. The displacement excitation is generated by the electromagnetic vibrator 28 that is connected to the horizontal vibrating table 27. The accelerometer 26b attached to the base and the accelerometer 26a attached to the mass simultaneously measure the accelerations of these, and calculate an acceleration transfer function of these in a frequency range using an operational function of the signal analyzer 30. A complex spring coefficient is adopted as an indicator of viscoelasticity, and calculated in accordance with the following theory using the obtained transfer function. Here, m represents a mass, x represents the absolute displacement of the mass, u represents the displacement of the horizontal vibrating table, and k* represents the complex spring constant of the MRE. A motion equation of a system that vibrates by displacement excitation may be expressed by the following equation (Equation 1).

[Equation 1]

$$m\ddot{x} = -k^*(x-u) \quad (1)$$

Here, the complex spring constant k* is defined by the following equation (Equation 2) considering frequency dependence.

[Equation 2]

$$k^*(\omega) = k'(\omega)\{1 + j\eta(\omega)\} \quad (2)$$

In Equation (2), k'(ω) represents a spring constant, η(ω) represents a loss factor, and ω represents an angular frequency. Further, j represents an imaginary unit. By Laplace transforming Equation (1) to calculate a transfer function G(s)=X/U (a response displacement X(s) with respect to a displacement input U(s)), the following equation (Equation 3) is obtained.

[Equation 3]

$$G(s) = X(s)/U(s) = \frac{k^*}{k^* + ms^2} \quad (3)$$

Further, by replacing s with jω and substituting the defined Equation (2) of the complex spring constant into Equation (3), a transfer function G(jω) in a frequency range is calculated as below.

[Equation 4]

$$G(j\omega) = \frac{k'(\omega) + jk'(\omega)\eta(\omega)}{\{k'(\omega) - m\omega^2\} + jk'(\omega)\eta(\omega)} \quad (4)$$

The transfer function can be expressed as G(jω)=$G_R$+j$G_I$ when the real part and the imaginary part of the acceleration transfer function obtained as actual measurement values are indicated as $G_R$ and $G_I$, respectively. By regarding $G_R$ and $G_I$ as being equal to the real part and the imaginary part of Equation (4) (equivalence), a spring constant k'(ω) and a loss factor η(ω) are calculated from actual measurement values using the following equations (Equations 5, 6).

[Equation 5]

$$k'(\omega) = \frac{\{G_R(G_R - 1) + G_I^2\}m\omega^2}{(G_R - 1)^2 + G_I^2} \quad (5)$$

[Equation 6]

$$\eta(\omega) = \sqrt{-1 + \frac{(2G_R - 1)m\omega^2}{(G_R - 1)k'(\omega)} - \frac{G_R m^2 \omega^4}{(G_R - 1)k'(\omega)^2}} \quad (6)$$

Next, a method for calculating a storage modulus E'(ω) from the spring constant k'(ω) will be described with reference to FIG. 3. Here, a viscoelastic body is a cuboid, and the thickness, width and length are t, b, and a, respectively. The lower surface of the viscoelastic body is restrained, and the top surface is displaced by d in the horizontal direction by an external force F.

First, the load F and the deformation amount d have the following relationship.

[Equation 7]

$$F = k'd \quad (7)$$

The symbol ω, which represents frequency dependence, is omitted. Next, the relationship of Equation (7) is transformed into a relationship between a shearing stress τ and a shearing strain γ generated in the viscoelastic body. The shearing stress τ and the shearing strain γ have a relationship expressed by the following equation using the storage modulus E'.

[Equation 8]

$$\tau = E'\gamma \quad (8)$$

Here, τ and γ are expressed as below using symbols in FIG. 3.

[Equation 9]

$$\tau = \frac{F}{ab} \quad (9)$$

[Equation 10]

$$\gamma = d/t \quad (10)$$

The storage modulus E' can be expressed as below by substituting Equation (7) into Equation (9) to delete F, and substituting Equations (9) and (10) into Equation (8).

[Equation 11]

$$E' = \frac{t}{ab}k' \quad (11)$$

Further, a loss modulus E" can be calculated as below using the storage modulus E' and the loss factor η.

[Equation 12]

$$E'' = \eta E' \quad (12)$$

In order to examine the magnetic field dependence of the MRE viscoelasticity, an acceleration transfer function at the time of random displacement excitation was measured by changing an electric current from 0 to 2 A stepwise (equivalent to a magnetic flux density of 0 to 200 mT) applied from the DC stabilizing power supply 1 to the coil 2. The spring constant and the loss factor were calculated using Equations (5) and (6) with respect to each constant current value.

EXAMPLES

Hereinafter, the present invention will be described by way of examples. However, the present invention is not limited to the following examples.

<Hardness>

The Asker C hardness according to the Standard SRIS0101 of the Society of Rubber Science and Technology, Japan was measured.

<Storage Modulus>

Figure 2:
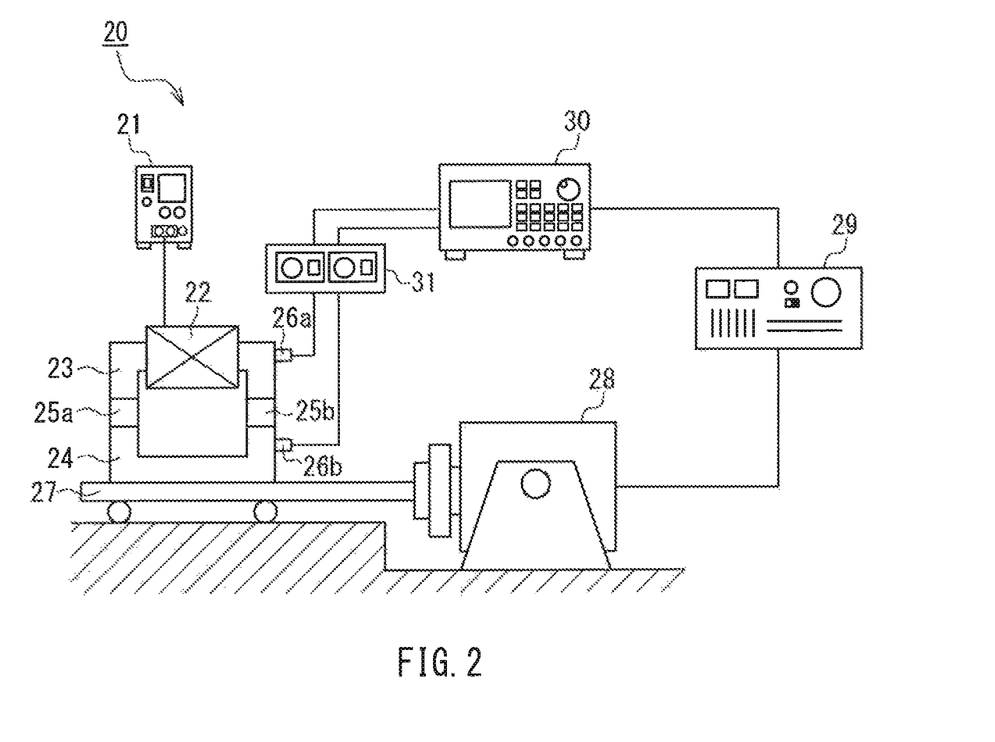
FIG. 2 is an explanatory view illustrating a method for measuring the storage modulus of a magneto-rheological elastomer composition sheet in an example of the present invention.
Figure 3:
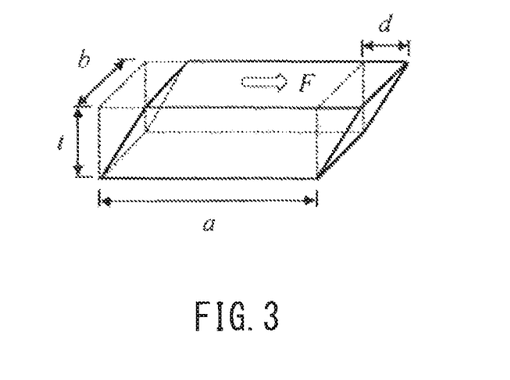
FIG. 3 is an explanatory view of symbols used to calculate the storage modulus.

The storage modulus was measured and calculated as indicated in FIGS. 2, 3 and the description using FIGS. 2, 3. These drawings and the description not only indicate the storage modulus measurement but also serve as an example of a vibration absorbing device of the present invention.

Examples 1 to 4

1. Material Component
(1) Silicone Component

Two-part, room temperature curing (two-part RTV) silicone rubber was used as a silicone component. A base polymer component (component (A)), a crosslinking component (component (B)), and a platinum-based metal catalyst (component (C)) had previously been added to the two-part RTV silicone rubber.

(2) Magnetic Powder

Example 1

Permalloy (50Fe-50Ni) with an average particle size of 10.5 μm after silane treatment (described below) was added in a proportion of 50 vol %, and the resultant was mixed uniformly to obtain a compound.

Example 2

A compound was obtained in the same manner as in Example 1 except that a carbonyl iron powder with an average particle size of 3.9 to 5.0 μm was used instead of permalloy.

Comparative Example 1

A compound was obtained in the same manner as in Example 1 except that a ferrite (Mn—Zn-based iron) with an average particle size of 10.8 μm was used instead of permalloy.

Comparative Example 2

A compound was obtained in the same manner as in Example 1 except that a ferrite (Ni—Zn-based iron) with an average particle size of 30.1 μm was used instead of permalloy.

(3) Silane Treatment

A silane coupler was added to the magnetic powder in a proportion of 1 mass %, and the mixture was stirred uniformly. The stirred magnetic powder was spread evenly on a tray etc., and dried at 100° C. for two hours.

2. Sheet Forming and Processing Method

A 3 mm thick metal frame was placed on a polyester film that had been subjected to a release treatment. Subsequently, the compound was poured into the metal frame, on which another polyester film that had been subjected to a release treatment was disposed. This layered product was cured at a pressure of 5 MPa and a temperature of 120° C. for 10 minutes, thereby forming a silicone rubber sheet with a thickness of 3.0 mm. Table 1 summarizes the physical properties of the silicone rubber sheets thus obtained.

TABLE 1

| | Type of magnetic powder | Addition amount (vol %) | Hardness (Asker C) | Change in storage modulus (times) |
|---|---|---|---|---|
| Ex. 1 | Permalloy (50Fe—50Ni) | 50 | 26 | 24.7 |
| Ex. 2 | Carbonyl iron powder | 50 | 27 | 28.0 |
| Comp. Ex. 1 | Ferrite (Mn—Zn-based iron) | 50 | 25 | 2.4 |
| Comp. Ex. 2 | Ferrite (Ni—Zn-based iron) | 50 | 27 | 1.9 |

*Ex.: Example,
Comp. Ex.: Comparative Example

From Table 1, the sheet containing the carbonyl iron powder had the greatest change in the storage modulus.

Examples 3-6, Comparative Examples 3-4

A carbonyl iron powder with an average particle size of 3.9 to 5.0 μm was used as the magnetic powder. In the experiment, the amount of the magnetic powder added was changed as indicated in Table 2. The other conditions were the same as those in Example 1. Table 2 summarizes the results.

TABLE 2

| | Magnetic powder | Addition amount (vol %) | Hardness (Asker C) | Change in storage modulus (times) |
|---|---|---|---|---|
| Ex. 3 | Carbonyl iron powder | 30 | 20 | 6.0 |
| Ex. 4 | Carbonyl iron powder | 40 | 27 | 14.4 |
| Ex. 5 | Carbonyl iron powder | 50 | 27 | 28.0 |
| Ex. 6 | Carbonyl iron powder | 60 | 35 | 12.6 |
| Comp. Ex. 3 | Carbonyl iron powder | 20 | 27 | 1.4 |
| Comp. Ex. 4 | Carbonyl iron powder | 80 | Unmoldable | — |

*Ex.: Example,
Comp. Ex.: Comparative Example

From Table 2, it is considered that the change in storage modulus depends on the content of the carbonyl iron powder and the hardness. When the content of the carbonyl iron powder was 60 vol %, the hardness increased but the change in storage modulus decreased. When the content of the carbonyl iron powder was 80 vol %, the fluidity at the time of molding was poor and the molding was impossible.

Figure 4:
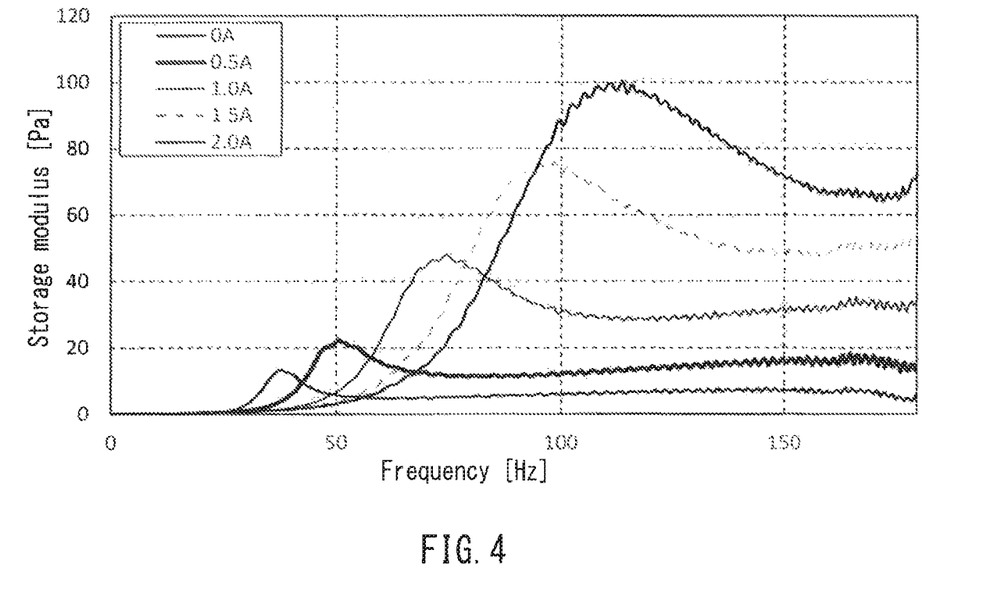
FIG. 4 is a graph showing the storage modulus and frequency characteristics of a magneto-rheological elastomer composition obtained in Example 4 of the present invention.

FIG. 4 is a measurement graph showing the frequency characteristic of the storage modulus of the magneto-rheological elastomer composition obtained in Example 4.

Examples 7-11, Comparative Example 5

A carbonyl iron powder with an average particle size of 3.9 to 5.0 μm was used as the magnetic powder. The experiment was performed in the same manner as in Example 1 except for the addition amount of a vulcanizing agent for changing the hardness of rubbers. Table 3 summarizes the conditions and results.

TABLE 3

| | Magnetic powder | Addition amount (vol %) | Addition amount of vulcanizing agent (vol %) | Hardness (Asker C) | Change in storage modulus (times) |
|---|---|---|---|---|---|
| Ex. 7 | Carbonyl iron powder | 50 | 0 | 10 | 43.6 |
| EX. 8 | Carbonyl iron powder | 50 | 0.20 | 25 | 28.9 |
| Ex. 9 | Carbonyl iron powder | 50 | 0.35 | 34 | 16.9 |
| Ex. 10 | Carbonyl iron powder | 50 | 0.50 | 40 | 11.9 |
| Ex. 11 | Carbonyl iron powder | 50 | 0.75 | 52 | 5.7 |
| Comp. Ex. 5 | Carbonyl iron powder | 50 | 1.00 | 69 | 2.2 |

*Ex.: Example,
Comp. Ex.: Comparative Example

From Table 3, it was found that when the content of the carbonyl iron powder was 50 vol % and the Asker C hardness was 10 to 52, the change in storage modulus upon application of a magnetic field was 5 times or more. When the Asker C hardness was 69, the change in storage modulus upon application of a magnetic field was less than 5 times.

INDUSTRIAL APPLICABILITY

The magneto-rheological elastomer composition of the present invention is applicable to products having various shapes, such as sheets, rods, extruded moldings, metal moldings, putty materials, and composites of these.

DESCRIPTION OF REFERENCE NUMERALS

10 magneto-rheological elastomer composition sheet
11 magnetic powder
12 matrix resin
20 storage modulus measuring device
21 DC stabilizing power supply
22 magnetic coil
23 upper iron core
24 lower iron core
25a, 25b MRE (measurement sample)
26a, 26b accelerometer
27 horizontal vibrating table
28 electromagnetic vibrator
29 power amplifier
30 signal analyzer
31 signal amplifier The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magneto-rheological elastomer composition comprising:
    a matrix resin that is an organopolysiloxane; and
    a magnetic powder in an amount of 40 to 60% by volume based on 100% by volume of the magneto-rheological elastomer composition, the magnetic powder being one of carbonyl iron powder, permalloy 50Fe-50Ni, or carbonyl iron powder and permalloy 50Fe-50Ni, at least a portion of the magnetic powder being surface treated with at least one of alkoxysilane and alkyltitanate, wherein
    the magneto-rheological elastomer composition is obtained by curing a mixture comprising:
        (A) a base polymer component: a linear organopolysiloxane having an average of two or more alkenyl groups per molecule, in which the alkenyl groups are bonded to silicon atoms at both ends of the molecular chain;
        (B) a crosslinking component: an organohydrogenpolysiloxane having an average of two or more hydrogen atoms bonded to silicon atoms per molecule, in which an amount of the organohydrogenpolysiloxane is less than 1 mol with respect to 1 mol of the alkenyl groups bonded to the silicon atoms in the component (A);
        (C) a platinum-based metal catalyst: an amount of the catalyst is 0.01 to 1000 ppm in weight with respect to the component (A); and
        (D) the magnetic powder: an amount of the magnetic powder is 40 to 60% by volume with respect to 100% by volume of the organopolysiloxane,
    the magneto-rheological elastomer composition has an Asker C hardness of 5 to 40 as determined by the Standard SRIS0101 of the Society of Rubber Science and Technology, Japan, and
    a storage modulus of the magneto-rheological elastomer composition changes by nine times or more upon application of a magnetic force with a magnetic flux density of 0.2 T.

2. The magneto-rheological elastomer composition according to claim 1, wherein the alkoxysilane is a silane compound or its partial hydrolysate, and the silane compound is expressed by $R(CH_3)_a Si(OR')_{3-a}$, where R represents an alkyl group having 1 to 20 carbon atoms, R' represents an alkyl group having 1 to 4 carbon atoms, and a is 0 or 1.

3. The magneto-rheological elastomer composition according to claim 1, wherein the magneto-rheological elastomer composition is in a sheet form.

4. A method for producing a magneto-rheological elastomer composition comprising an organopolysiloxane matrix and a magnetic powder, the magnetic powder contained in an amount of 40 to 60% by volume based on 100% by volume of the magneto-rheological elastomer composition, the magneto-rheological elastomer composition having an Asker C hardness of 5 to 40 as determined by the Standard SRIS0101 of the Society of Rubber Science and Technology, Japan, and a storage modulus of the magneto-rheological elastomer composition changing by nine times or more upon application of a magnetic force with a magnetic flux density of 0.2 T, the method comprising:
    curing a mixture to obtain the magneto-rheological elastomer composition, the mixture comprising:
        (A) a base polymer component: a linear organopolysiloxane having an average of two or more alkenyl groups per molecule, in which the alkenyl groups are bonded to silicon atoms at both ends of the molecular chain;

(B) a crosslinking component: an organohydrogenpolysiloxane having an average of two or more hydrogen atoms bonded to silicon atoms per molecule, in which an amount of the organohydrogenpolysiloxane is less than 1 mol with respect to 1 mol of the alkenyl groups bonded to the silicon atoms in the component (A);

(C) a platinum-based metal catalyst: an amount of the catalyst is 0.01 to 1000 ppm in weight with respect to the component (A); and (D) the magnetic powder: an amount of the magnetic powder is 40 to 60% by volume with respect to 100% by volume of the organopolysiloxane, the magnetic powder being one of carbonyl iron powder, permalloy 50Fe-50Ni, or carbonyl iron powder and permalloy 50Fe-50Ni, at least a portion of the magnetic powder being surface treated with at least one of alkoxysilane and alkyltitanate.

5. The method for producing the magneto-rheological elastomer composition according to claim 4, wherein the alkoxysilane is a silane compound or its partial hydrolysate, and the silane compound is expressed by $R(CH_3)_a Si(OR')_{3-a}$, where R represents an alkyl group having 1 to 20 carbon atoms, R' represents an alkyl group having 1 to 4 carbon atoms, and a is 0 or 1.

6. The method for producing the magneto-rheological elastomer composition according to claim 4, the curing of the mixture to obtain the magneto-rheological elastomer composition comprising:

pouring the mixture into a metal frame placed on a polyester film that has been subjected to a release treatment, and disposing thereon another polyester film that has been subjected to a release treatment, and heat curing the mixture to obtain a sheet of the magneto-rheological elastomer composition.

7. A vibration absorbing device comprising:

a magneto-rheological elastomer composition, the magneto-rheological elastomer composition comprising:

a matrix resin that is an organopolysiloxane, and a magnetic powder contained in an amount of 40 to 60% by volume based on 100% by volume of the magneto-rheological elastomer composition, the magnetic powder being one of carbonyl iron powder, permalloy 50Fe-50Ni, or carbonyl iron powder and permalloy 50Fe-50Ni, at least a portion of the magnetic powder being surface treated with at least one of alkoxysilane and alkyltitanate, wherein the magneto-rheological elastomer composition is obtained by curing a mixture comprising:

(A) a base polymer component: a linear organopolysiloxane having an average of two or more alkenyl groups per molecule, in which the alkenyl groups are bonded to silicon atoms at both ends of the molecular chain;

(B) a crosslinking component: an organohydrogenpolysiloxane having an average of two or more hydrogen atoms bonded to silicon atoms per molecule, in which an amount of the organohydrogenpolysiloxane is less than 1 mol with respect to 1 mol of the alkenyl groups bonded to the silicon atoms in the component (A);

(C) a platinum-based metal catalyst: an amount of the catalyst is 0.01 to 1000 ppm in weight with respect to the component (A); and (D) the magnetic powder: an amount of the magnetic powder is 40 to 60% by volume with respect to 100% by volume of the organopolysiloxane, the magneto-rheological elastomer composition has an Asker C hardness of 5 to 40 as determined by the Standard SRIS0101 of the Society of Rubber Science and Technology, Japan, and a storage modulus of the magneto-rheological elastomer composition changes by nine times or more upon application of a magnetic force with a magnetic flux density of 0.2 T, the magneto-rheological elastomer composition is arranged in a vibration portion, and the vibration absorbing device absorbs vibration in the vibration portion using a change in the storage modulus of the magneto-rheological elastomer composition upon application of a magnetic force.

8. The vibration absorbing device according to claim 7, wherein the alkoxysilane is a silane compound or its partial hydrolysate, and the silane compound is expressed by $R(CH_3)_a Si(OR')_{3-a}$, where R represents an alkyl group having 1 to 20 carbon atoms, R' represents an alkyl group having 1 to 4 carbon atoms, and a is 0 or 1.

* * * * *